(12) United States Patent
Grether

(10) Patent No.: US 7,871,023 B2
(45) Date of Patent: Jan. 18, 2011

(54) TWO-PART FLOW REGULATOR, JET REGULATOR OR BACKFLOW PREVENTER HAVING A SNAP-IN JOINT BETWEEN THE PARTS

(75) Inventor: Hermann Grether, Mullheim (DE)

(73) Assignee: Neoperl GmbH, Mullheim (DE)

( * ) Notice: Subject to any disclaimer, the term of this patent is extended or adjusted under 35 U.S.C. 154(b) by 659 days.

(21) Appl. No.: 11/814,688

(22) PCT Filed: Jan. 24, 2006

(86) PCT No.: PCT/EP2006/000602

§ 371 (c)(1),
(2), (4) Date: Jul. 25, 2007

(87) PCT Pub. No.: WO2006/079505

PCT Pub. Date: Aug. 3, 2006

(65) Prior Publication Data

US 2009/0008478 A1    Jan. 8, 2009

(30) Foreign Application Priority Data

Jan. 25, 2005  (DE) .................. 20 2005 001 101 U
Sep. 5, 2005   (DE) ...................... 10 2005 042 212

(51) Int. Cl.
  *E03C 1/08*   (2006.01)
  *B05B 1/14*   (2006.01)
  *F23D 14/68*  (2006.01)
  *B05B 1/00*   (2006.01)
(52) U.S. Cl. .................. 239/600; 239/428.5; 239/553; 239/553.3; 239/553.5; 239/590
(58) Field of Classification Search .............. 239/428.5, 239/553, 553.3, 553.5, 590, 600, DIG. 23
See application file for complete search history.

(56) References Cited

U.S. PATENT DOCUMENTS

| 4,000,857 | A  | * | 1/1977  | Moen .................... 239/428.5 |
| 4,365,755 | A  | * | 12/1982 | Aghnides ................ 239/428.5 |
| 5,356,079 | A  | * | 10/1994 | Rahbar ................... 239/585.1 |
| 6,126,093 | A  | * | 10/2000 | Grether et al. ........... 239/428.5 |
| 6,902,123 | B2 | * | 6/2005  | Grether et al. ........... 239/428.5 |

FOREIGN PATENT DOCUMENTS

DE          639026        11/1936

(Continued)

*Primary Examiner*—Len Tran
*Assistant Examiner*—Ryan Reis
(74) *Attorney, Agent, or Firm*—Volpe and Koenig, P.C.

(57) ABSTRACT

A flow regulator, jet regulator or backflow preventer (11) having at least two components or parts (2, 11), a first one (2) of which can be inserted into a receiving opening (12) of the second part (12). The two parts (2, 11) can be interconnected using a locking arrangement (13, 17). One part is provided with at least one locking cam while the other part (11) is provided with a locking groove which is assigned to the locking cam and is used as a counterpart. One of the parts is provided with a slot (15) or similar recess located at a distance (a) from the outer or inner circumference of the part (2) in the area of the at least one locking groove. The wall section (16) of the part which supports the locking groove or locking cam located on the inner or outer side can be resiliently deflected into and out of the slot in a locking manner due to the resiliency thereof so that a reduced amount of pressure is required to lock the parts (2, 11) together while allowing for comparatively greater tolerances for the snap-in connection. One component can be made of a transparent or semi-transparent material as a filtering sieve or attached sieve (2) while the second is embodied as a jet regulator, flow regulator and/or backflow preventer.

22 Claims, 9 Drawing Sheets

FOREIGN PATENT DOCUMENTS

| | | |
|---|---|---|
| DE | 3817270 | 11/1989 |
| DE | 4413060 | 10/1995 |
| DE | 19618692 | 11/1997 |
| DE | 29718727 | 11/1997 |
| DE | 202005001101 | 5/2005 |
| DE | 202005010640 | 1/2006 |
| EP | 0733748 | 3/1996 |
| GB | 2233246 | 1/1991 |
| WO | 2004038112 | 5/2004 |

* cited by examiner

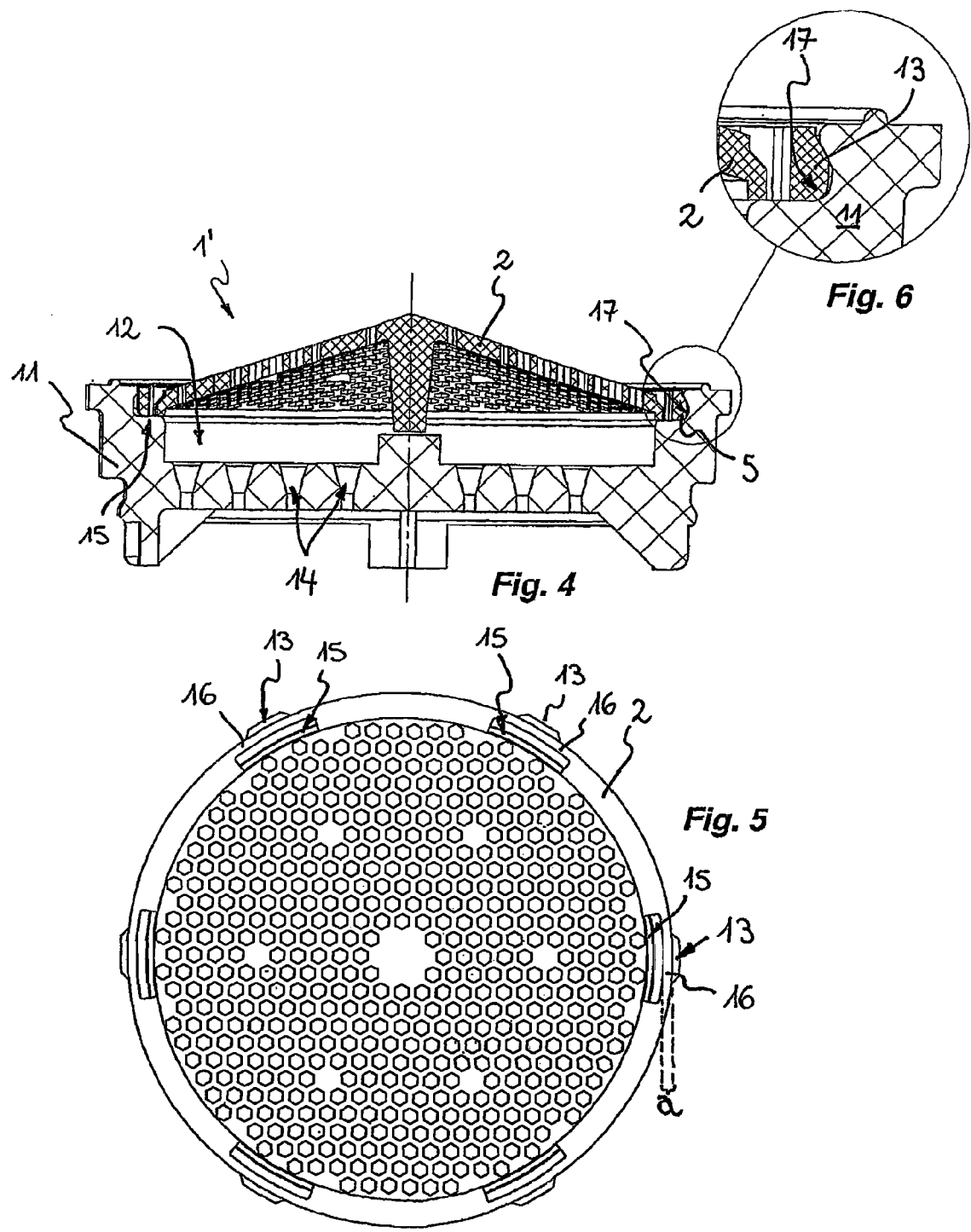

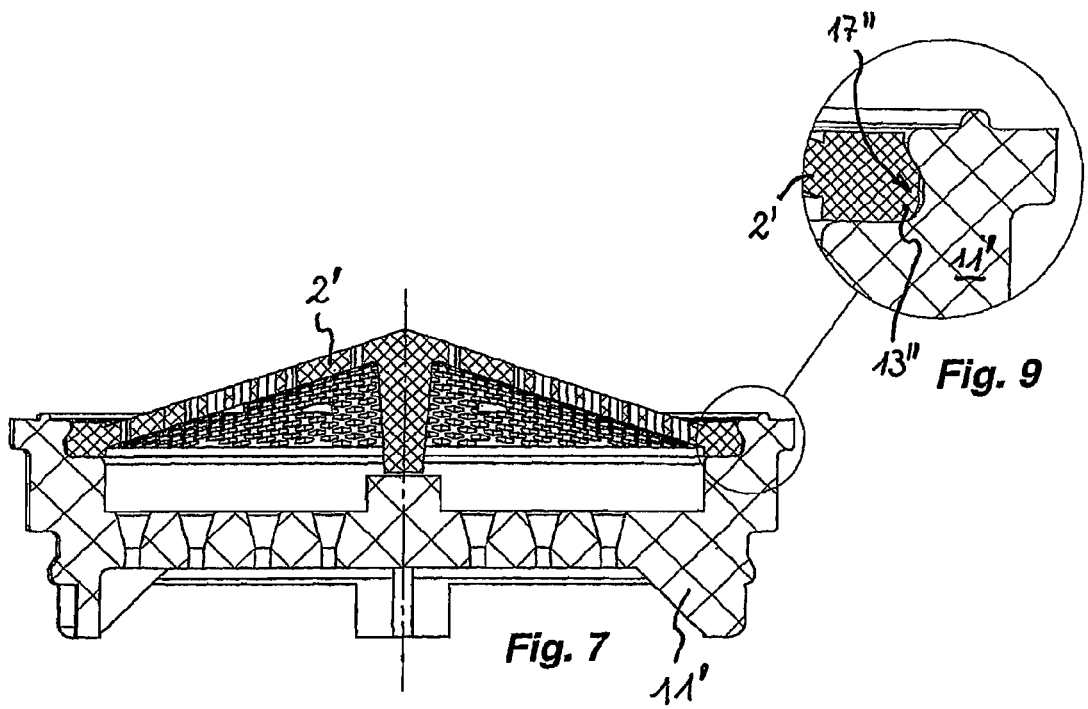
Fig. 7
Fig. 9
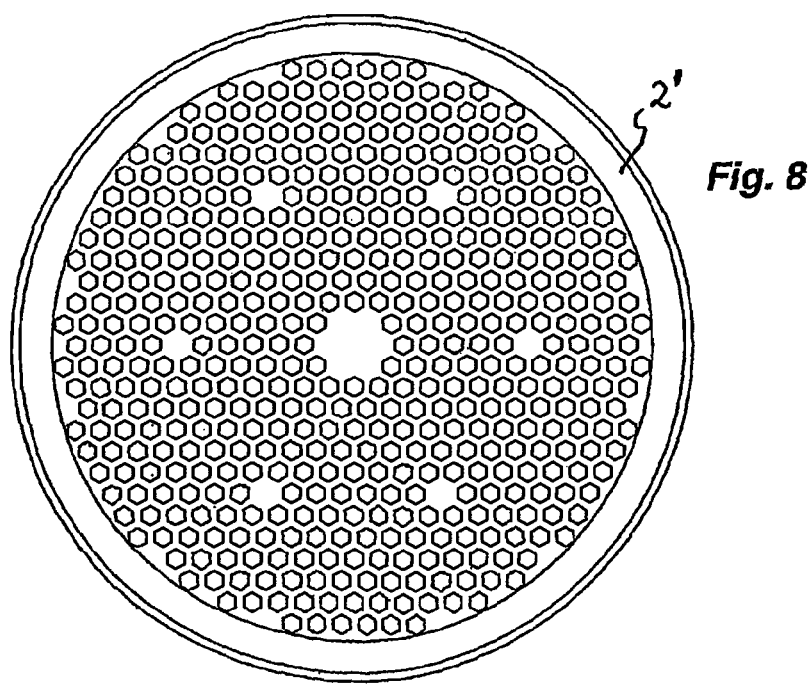
Fig. 8

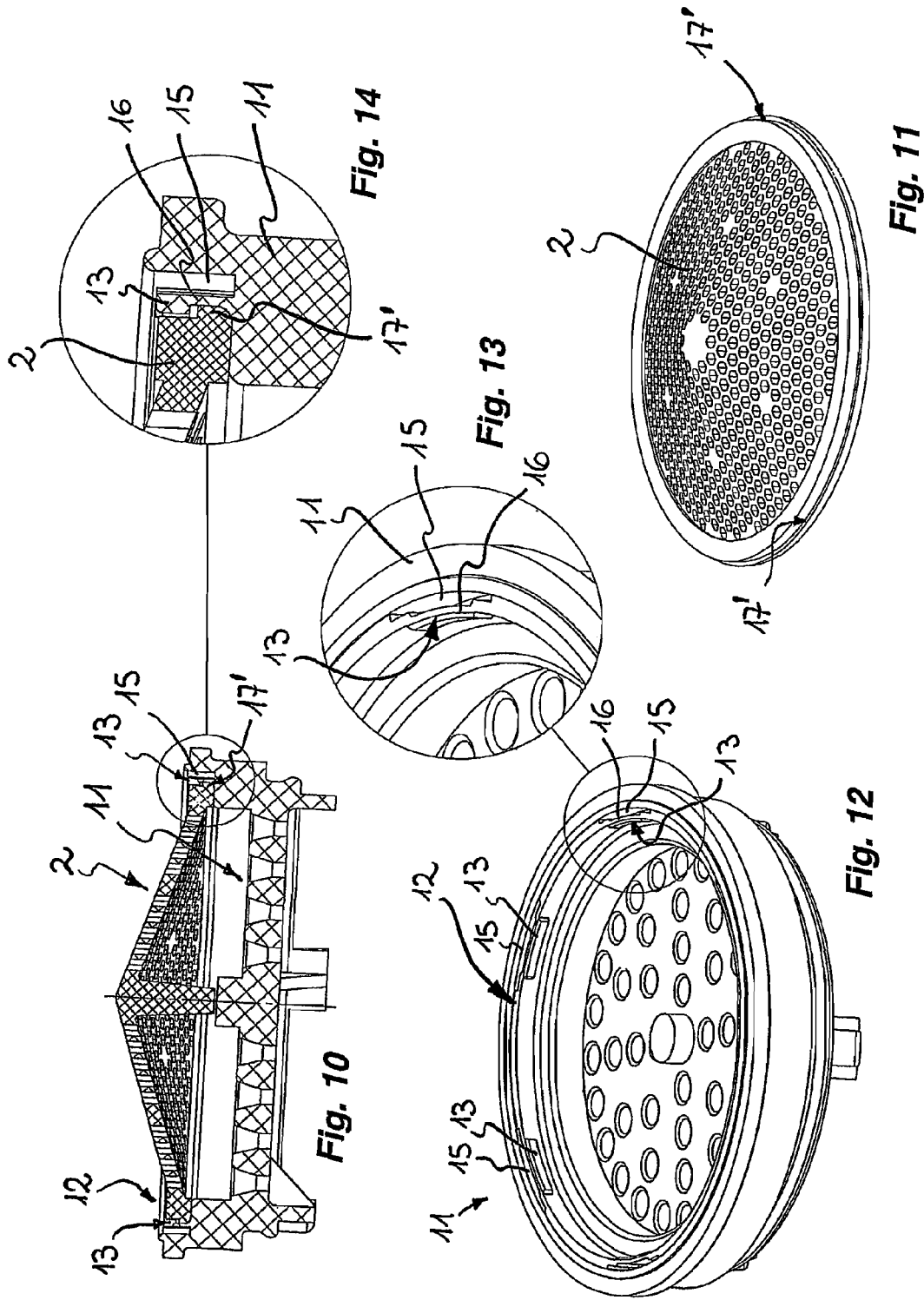

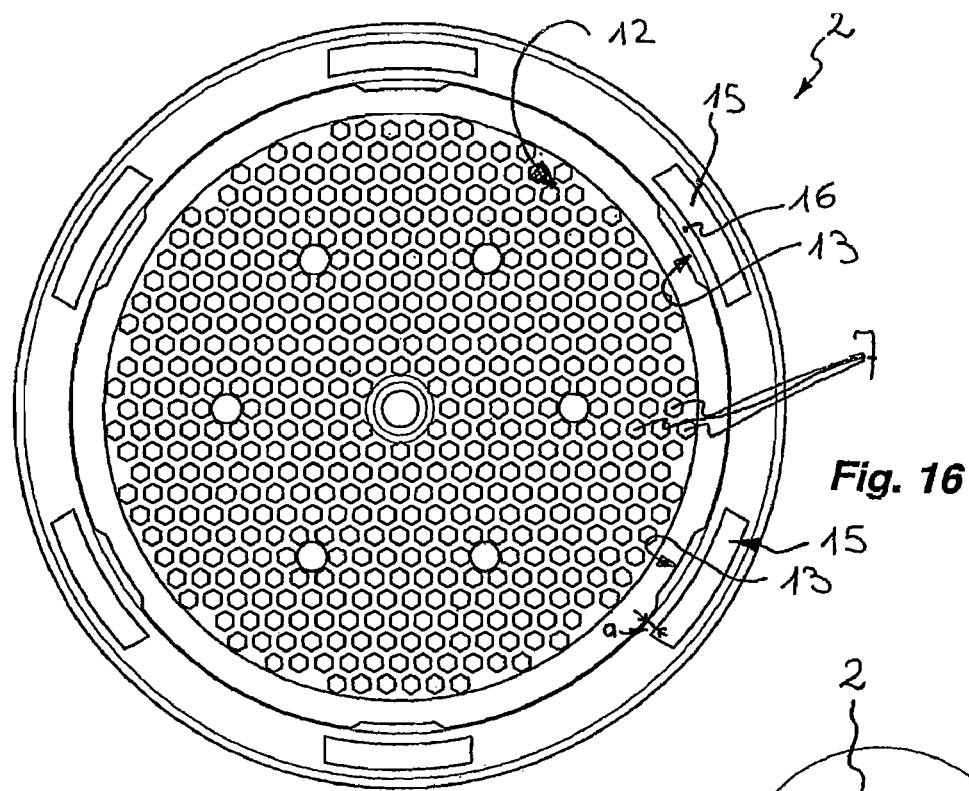
Fig. 16
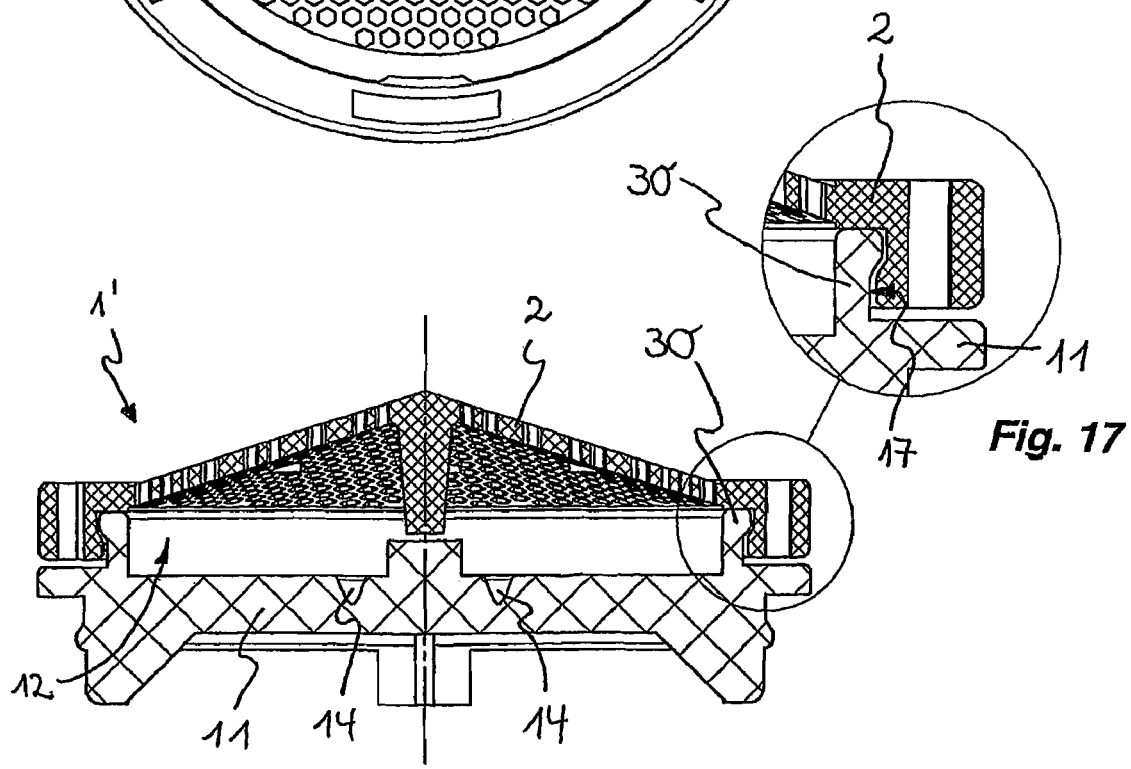
Fig. 17
Fig. 15

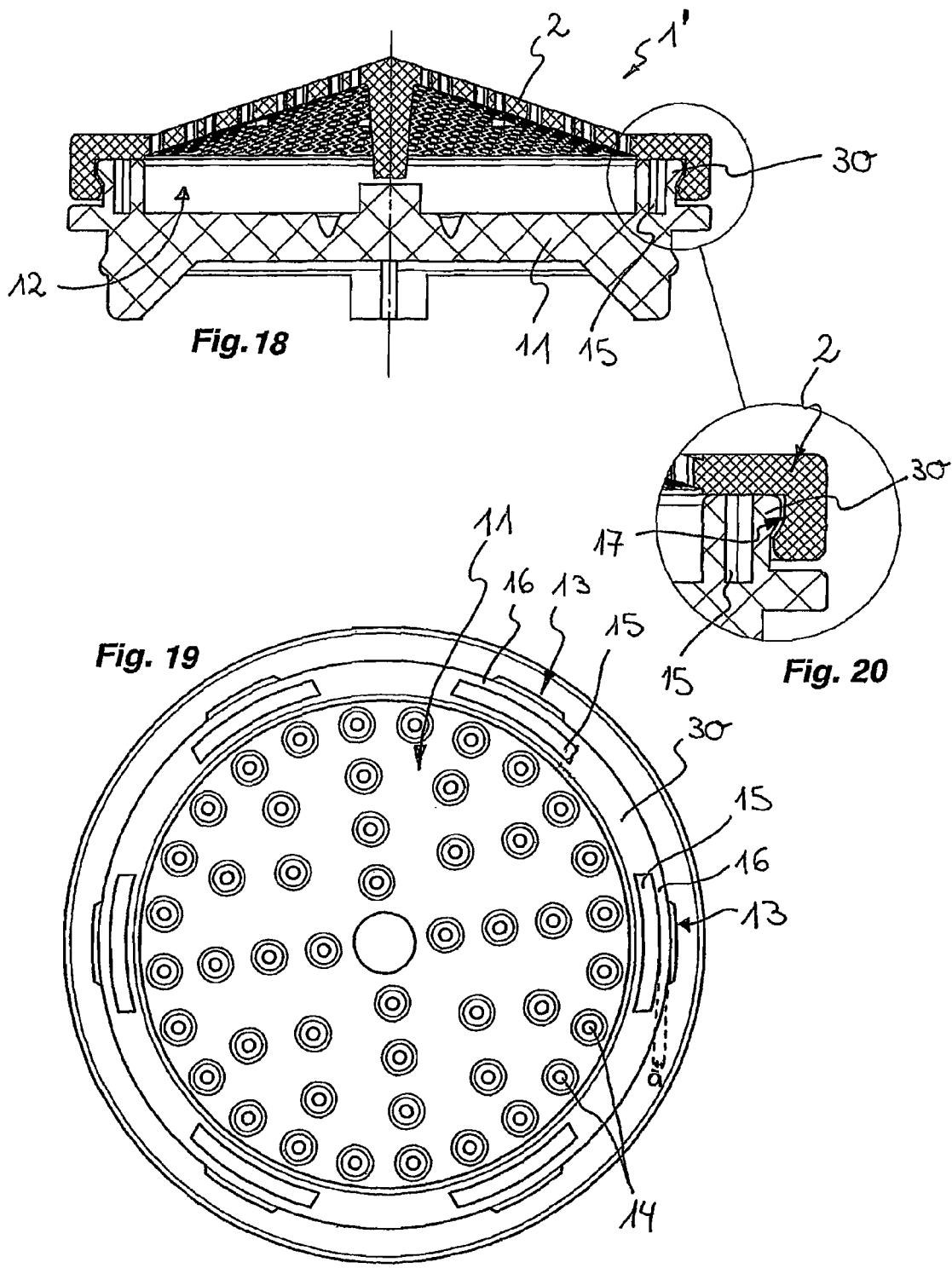

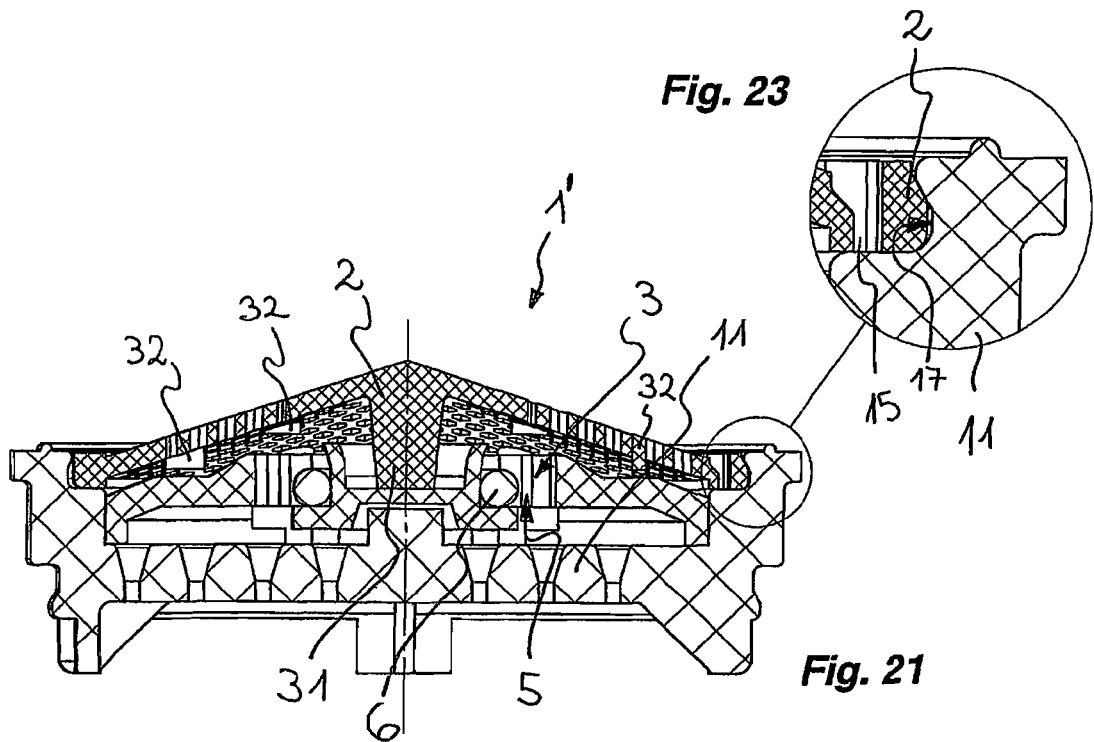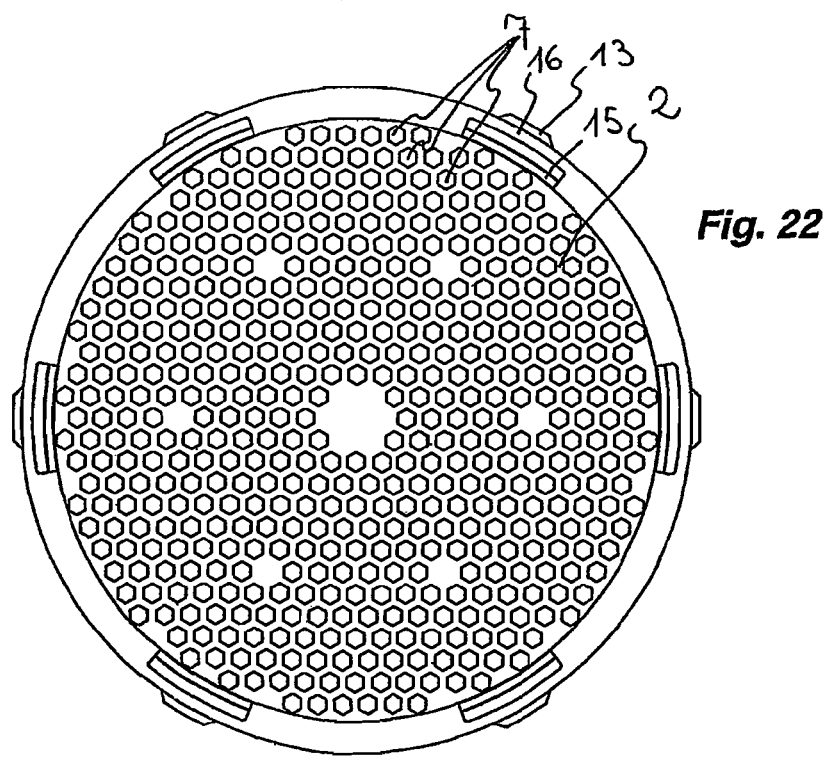

TWO-PART FLOW REGULATOR, JET REGULATOR OR BACKFLOW PREVENTER HAVING A SNAP-IN JOINT BETWEEN THE PARTS

BACKGROUND

The invention relates to a plumbing fixture which can be inserted into a supply tube, having at least two components, a first one of which can be inserted into the receiving opening of a second part, and which components can be connected to each other with the aid of locking means and counter-locking means, with one part being provided with at least one locking means and the other part with a locking counter-means, serving as a counterpart of said locking means.

Various different plumbing fixtures are known, which are provided with a jet regulator, a flow regulator, and/or a backflow preventer. In order to ensure the long lasting function of such a plumbing fixture and to counteract the entry of dirt particles entrained in the water into the jet regulator, the flow regulator or the backflow preventer, the plumbing fixtures of prior art are usually provided with a preliminary sieve upstream. Here, said preliminary sieve can be inserted into a receiving opening at the face of a downstream following jet regulator or a similar component and be held there via a locking or snap-in connection.

In order to allow an easy interlocking of these components or parts of the fixtures of prior art the parts must be produced, particularly in the area of their locking or snap-in connection, precisely and without any sizeable production tolerances. The production of these components is therefore due to this alone associated with a comparatively high production expense.

From DE 38 17 270 A1 a jet regulator insert is known, which can be inserted into the outlet mouthpiece of a plumbing faucet. In order to reduce a developing increasing back pressure due to contamination at the back of the insert, the passage cross-section of the jet regulator can be enlarged when a predetermined back pressure is exceeded, by releasing the jet regulator insert from its normal operating position and allowing it into a trigger position, in which a circular channel is formed around the insert widening the overall open cross-section of the passage. For this purpose the jet regulator insert is inserted from the outlet side into the outlet mouthpiece and held here by a holding device. Said holding device is a component of a trigger device, which releases the jet regulator insert when a predetermined back pressure is exceeded. Said holding device is provided with spring clips to hold the jet regulator insert in its normal position, which protrude circumferentially beyond the perimeter wall of the jet regulator insert and carry snapping ribs at their free ends. The spring clips point with their free ends opposite the flow direction and engage with their snapping ribs into an encircling circular groove in the outlet mouthpiece.

For the compression and release of the spring clips to cause interlocking a respectively large axial play must always be given between the exterior perimeter wall of the jet regulator insert, on the one side, and the interior perimeter of the outlet mouthpiece, on the other hand, due to the fact that in the jet regulator insert known from DE 38 17 270 A1 the snapping ribs, even in the compressed state of the spring clips, cannot enter the enveloping circle determined by the exterior perimeter of the wall of the jet regulator insert. Although such an axial play is easily possible where the cross-section of the tube in the flow direction can widen, however, in such components in which the connection area is always subject to water flow usually the connection should be as form-fitting as possible without any large axial play.

From WO 2004/038112 A an adapter is known, which at the outlet side can be screwed into the water outlet of a plumbing fixture and in which the jet regulator can be inserted. In order to ensure the function of the jet regulator inserted into the adapter the adapter can be locked to a preliminary sieve. Said preliminary sieve has an encircling locking bead at its exterior sieve perimeter, which engages the locking grooves of several crown-shaped spring clips protruding from the adapter. Although a recess is provided in form of a circular groove between the wall section of the preliminary sieve carrying the locking bead and the conical sieve surface, the wall section carrying the locking bead is embodied so massively that an insertion of this wall section seems not easily possible. In order to detach the locking connection between the preliminary sieve and the adapter the crown-shaped protruding spring clips provided at the adapter can be deflected outwardly, without essentially enlarging the axial longitudinal extension of the adapter.

SUMMARY

Therefore the object is to provide a plumbing fixture of the type mentioned at the outset, which can be produced with components that can interlock having relatively high tolerances in an area of their locking or snap-in connection and thus with a relatively low expense.

This object attained according to the invention comprises a plumbing fixture of the type mentioned at the outset, in particular with one of these components carrying the locking means at the exterior or interior perimeter and in the area of said locking means it is provided with a recess at a distance from the exterior and interior perimeter of said part, into which recess the wall section of said part carrying the locking means at the exterior or interior perimeter can be inserted in a spring-elastic fashion.

The fixture according to the invention is provided with a first part, which can be inserted into an accommodating opening of a second part, and which can be interlocked there via locking means. In order to preferably allow these parts to be interlocked in a detachable manner at lease one locking means is provided at one part and at the other part a locking counter-means is provided, serving as the counterpart. In order to allow these parts to be produced with relatively large allowances and/or allowing interlocking with little expense a this part a recess is provided at the area of the locking means, which recess being arranged at a distance from the exterior or interior perimeter of this part and into which the wall section of this part carrying the locking means at the interior or exterior perimeter can be inserted in a spring-elastic fashion. Due to the fact that this wall section can be inserted in a spring-elastic fashion and based on the spring-elasticity of the material used it also can be detached from the locking connection in a spring-elastic fashion a reduced pressure is sufficient for interlocking the parts at comparatively large range of allowances of the locking connection. Although the respective part can be deformed in a predetermined manner in the area of its locking means for the purpose of locking the overall contour of said part is maintained. Due to the targeted deforming of said part in the area of its snapping means this part can otherwise be embodied with a stiff wall thickness.

However, due to the fact that the parts can be safely connected to each other with little pressure a quick and dynamic construction during production and the assembly of the fixture is facilitated.

Here it is advantageous for the locking means to be embodied as a locking groove or a locking cam.

A preferred embodiment provides for the recess to be embodied as a slit.

In order to promote a secure and fixed locking between the two components or parts that can be detachably connected to each other, preferably several locking cams or locking devices are provided arranged distributed over the interior and/or the exterior circumference of the first and/or the second component.

A further development according to the invention provides that the locking devices engaging each other ensure the correctly located allocation of the first component in reference to the second one. In this further embodiment, the two components can be connected to each other in such a correct position that these components are held in a desired position in reference to each other, for example in the circumferential direction.

Here, it may be beneficial when at least an appropriate number of locking grooves for the number of locking cams is provided. However, it is also possible that the locking cams provided on one component cooperate with an encircling locking element protruding from the other component in a flange-like manner.

Here, a preferred embodiment according to the invention provides that the locking cams and the locking grooves are essentially embodied in a complementary shape.

In order to promote a rapid and easy interlocking of the two components, it is advantageous if the locking elements provided on the first and the second component are each arranged in one cross-sectional plane.

The embodiment of the plumbing fixture provided according to the invention allows that a fixture can also be embodied with a relatively thick circumferential wall at its circumferential area. Here, the distance of the slot or a similar cavity from the exterior or interior circumference of the respective component can be selected depending on the desired spring elasticity of the wall section that can be led therein to adjust the pressure to the desired strength necessary to interlock these components.

The recess, into which wall section carrying the exterior or interior circumferential locking groove or locking cam can be flex in a spring-elastic manner, can also be embodied as a blind opening, for example. In order to allow this cavity to be embodied, in particular as a slot, or in order to provide it as a counter locking element in reference to the locking cam, it is beneficial if one of the components is embodied like a flange at its exterior or interior circumference in the area of at least one locking element.

A preferred embodiment according to the invention provides that locking cams are provided on the first component, which cooperate with at least one locking groove at the second component.

It is also possible, though, that the locking cams are provided at the second component, which cooperate with at least one locking groove or with a locking means at the first component protruding in a flange-like manner.

A preferred embodiment of the fixture according to the invention provides for the first component to be embodied as a preliminary or filter sieve and the second component as a jet regulator, flow regulator, and/or backflow preventer.

In order to allow the control of the functionality of such a preliminary or filter sieve, if necessary also in cooperation with other inserted plumbing parts even in the assembled state without any problems, a further possibility in itself worth protecting provides that the preliminary or filter sieve is made from a transparent or semitransparent material.

Filter sieves have been known which are positioned upstream in reference to jet regulators, flow regulators, and/or backflow preventers and which shall protect said plumbing fixtures from dirt particles entrained in the water. These filter sieves that can be inserted into a water pipe are usually connected to the individual plumbing parts in a detachable manner and are inserted in an outlet piece, forming a combined functional unit, which can be mounted to the faucet of a plumbing fixture in a detachable manner. The filter sieve is usually produced from a perhaps opaque colored plastic, which blocks the view to the inserted parts at the downstream side. Due to the fact that the colored filter sieve blocks the view and due to the fact that the view is even more blocked in a fixture already inserted in an outlet it is not easily discernible if any, and perhaps which inserted parts follow downstream and to what extent these inserted parts are functional.

From DE 639 026 C a jet regulator is known having a housing that can be put onto a faucet outlet, with its outlet-side housing opening being closed by several sieves. Due to the fact that the level of contamination of the sieves cannot be determined in jet regulators of prior art there is the risk, particularly in case of an unusually rapid contamination of the sieves, that the jet regulator is ejected from the mouth of the faucet. In order to prevent this mischief the entire housing of the jet regulator known from DE 639 026 is made from a clear material.

From DE 196 18 692 A1 a filter device is known for fluids, with a filter web being provided in its tubular housing. In order to evaluate the level of contamination of the filter web in this known filter device the housing can be made from clear plastic. A similar filter device with a clear housing is known from GB 2 233 246 A.

The subject of the invention described in claim 14 differs from prior art both in its object as well as the features according to the invention. Rather, the subject of the invention described in claim 14 and embodied as a preliminary or filter sieve is made from a transparent or semi-transparent material in order to allow easily to control the functionality of said filter sieve, if necessary even in cooperation with other plumbing fixtures and in the assembled state. Due to the fact that the preliminary or filter sieve according to the invention is made from a transparent or semitransparent material the view to the downstream side is even possible when the filter sieve is mounted to additionally inserted plumbing fixtures and/or inserted into an faucet outlet. The manufacturer or the user can therefore easily control if the filter sieve, with or without any additional inserted parts, is operational and if any perhaps necessary inserted or mounted parts are in a visibly functional condition. Furthermore it is discernible through the transparent preliminary sieve if the plumbing fixture is even provided with a flow regulator. When individual components of the plumbing fixture and in particular the flow regulator are arranged between the jet regulator and the preliminary sieve are color coded, the manufacturer, the dealer, or the consumer can immediately detect from the color allocation of the flow regulator shining through the preliminary sieve which hydraulic flow capacity is given, here.

The filter sieve according to the invention can generally be produced from any suitable transparent or semitransparent material, such as for example glass, ceramics, or any other see-through material. A preferred embodiment according to the invention provides for the filter sieve to be embodied as an injection-molded part and/or made from plastic. In particular, a filter sieve embodied as a injection-molded plastic piece can be produced with little expense yet still precisely.

Here, an embodiment is preferred in which the filter sieve can be connected downstream to at least one inserted part or fixture in a detachable fashion. Such a filter sieve can ensure the functionality of the subsequent downstream positioned inserted parts in a dual manner, by filtering the dirt particles entrained in the water, which otherwise could interfere with the functionality of the inserted parts, on the one hand, and by allowing a visual control downstream from the filter sieve and the inserted parts perhaps located therebehind, on the other hand.

It is particularly advantageous when the filter sieve opens the view or keeps it free to the inserted or mounted parts allocated upstream of a filter sieve. Here, a preferred embodiment according to the invention provides that a flow regulator is allocated downstream from the filter sieve. Plumbing fixtures and particular flow regulators are primarily on their upstream side embodied complex and/or made from multiple parts, so that here a visual control is particularly recommended. The filter sieve can also be a component of a multipart function unit. Here, a preferred embodiment according to the invention provides that the filter or preliminary sieve is allocated to a flow regulator, with a filter sieve being arranged at its upstream side and a jet regulator on its downstream side.

A preferred embodiment of the invention provides that the flow regulator has a control gap, with its flow cross-section being adjustable via an O-ring made from an elastic material, which can be deformed under the pressure of inflowing water, and that the O-ring is visible through the filter sieve allocated to the flow regulator. Due to the fact that in such an embodiment the O-ring is mounted movable and accordingly loosely on the flow regulator there is the risk that this mandatory O-ring perhaps can even be lost during the assembly of the flow regulator. When now at the upstream side of the flow regulator, a previously commonly opaque filter sieve is mounted it is subsequently no longer easily discernible that the flow regulator connected to the filter sieve is no longer operational due to the missing O-ring. However, using a mere visual control through the filter sieve according to the invention allows easy detection that the necessary O-ring is missing from the flow regulator connected thereto.

The dirt particles filtered out by the filter sieve contact the circumferential edge of the filter sieve without interfering with the view through the filter sieve when the filter sieve is curved convexly or conical in the upstream direction. A visual control is also facilitated by the sieve openings of the filter sieve according to the invention when the sieve openings of the filter sieve are arranged approximately coaxially in reference to each other and preferably axially parallel in reference to the longitudinal axis of the sieve.

The filter sieve can secure the flow regulator, necessarily downstream, or similar inserted parts from the loss of their O-ring or similar components when the filter sieve is connected to at least one plumbing fixture via a snap-in connection. Here a preferred embodiment of the invention provides that the filter sieve, the jet distributor, or a similar inserted part have a circular collar and that said circular collar has at least one locking protrusion, which can be connected in a detachable manner to a locking groove or a similar locking means of an adjacent inserted part, which is provided at its near face.

A preferred embodiment according to the invention provides that the filter sieve has sieve openings in its open cross-section arranged hexagonally or honeycomb-shaped. This embodiment is characterized, in spite of its sieve openings, not only by a relatively open cross-sectional flow area, rather this relatively large open flow area allows a particularly good visual control of the downstream side of the filter sieve and any inserted parts potentially positioned therebehind.

BRIEF DESCRIPTION OF THE DRAWINGS

Additional details of the invention are discernible from the claims as well as the drawing. In the following the invention is explained in greater detail using a preferred exemplary embodiment.

Shown are.

DETAILED DESCRIPTION OF THE PREFERRED EMBODIMENTS

Figure 1:
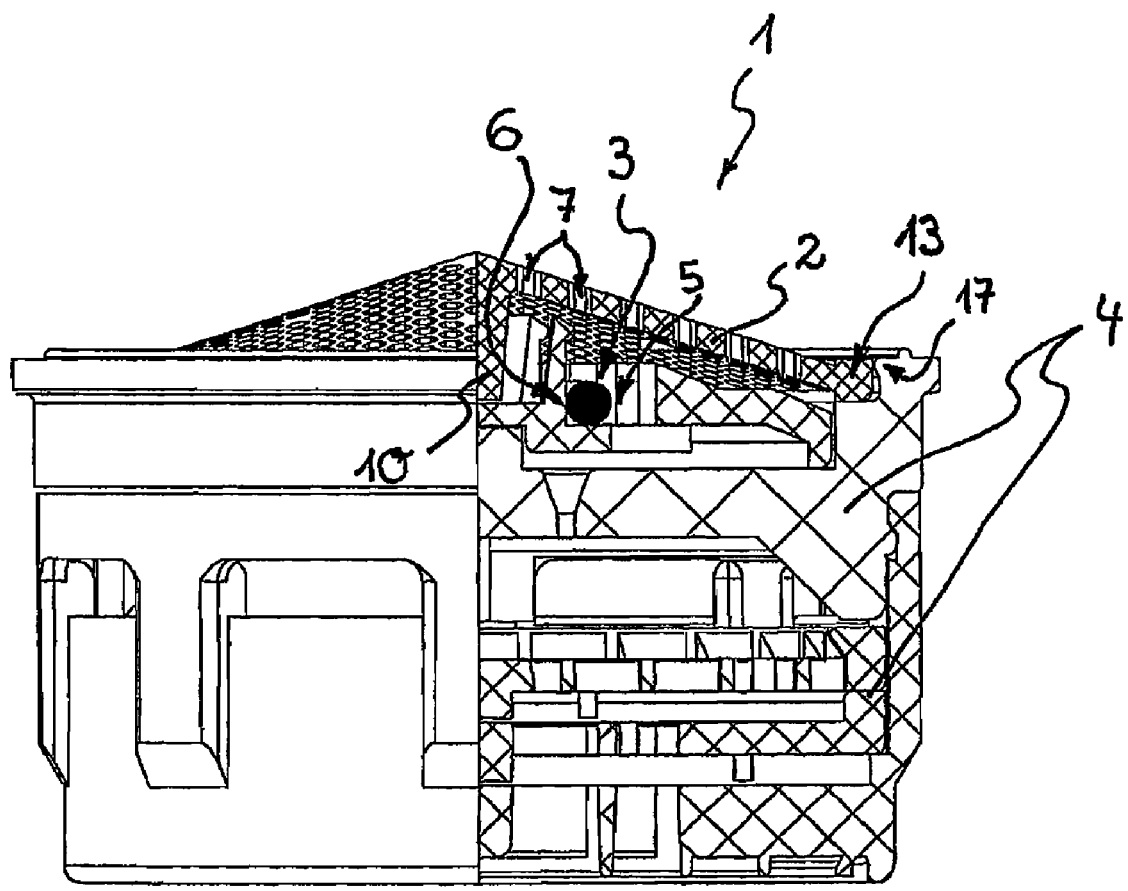
FIG. 1 a view of a functional plumbing unit, comprising a jet regulator, a flow regulator, as well as an upstream filter sieve, FIG. 2 a perspective view of the functional plumbing unit of FIG. 1 at its upstream side, FIG. 3 a top view of the functional plumbing unit of FIGS. 1 and 2 at its upstream side, with the filter sieve comprising a transparent plastic material also allowing a visual control of the flow regulator located downstream therebehind, FIG. 4 a longitudinal cross-sectional view of the jet distributor embodied as a perforated plate and connected to a preliminary or filter sieve of a jet regulator, otherwise not shown, FIG. 5 a top view of the preliminary or filter sieve of FIG. 4, FIG. 6 a view of the preliminary or filter sieve and the jet distributor of FIG. 4 in the area of their locking or snap-in connection, FIG. 7 a longitudinal cross-sectional view of the combination of a preliminary sieve and a jet regulator according to prior art, FIG. 8 a view of the preliminary or filter sieve of the known jet regulator of FIG. 7, FIG. 9 a view of the preliminary or filter sieve and the jet distributor of the jet regulator known from prior art in the area of its locking or snap-in connection, FIG. 10 a longitudinal cross-sectional view of a jet distributor comparable to FIG. 4 which can be locked with a preliminary or filter sieve, FIG. 11 a perspective view of the preliminary or filter sieve of FIG. 10, FIG. 12 a perspective view of the jet distributor of FIG. 10, FIG. 13 a detailed view of the jet distributor of FIG. 10 and FIG. 12 in the area of a wall section of the interior circumferential wall, supporting the locking cam at the interior circumference and being limited by a slot-type cavity, FIG. 14 a view of the unit comprising a jet distributor and a preliminary sieve according to FIGS. 10 through 13 in the area of the interlocking locking means, FIG. 15 a longitudinal cross-sectional view of the jet distributor connected to a preliminary sieve and embodied as a perforated plate of a jet regulator, otherwise not shown, with the jet distributor together with a circular collar protruding upstream can be inserted into a receiving opening of the preliminary sieve and with locking cams for a detachable locking at the jet distributor being provided at the circular wall limiting the receiving opening of the preliminary sieve, FIG. 16 a bottom view of the preliminary sieve of FIG. 15 at its downstream face, FIG. 17 a longitudinal cross-sectional view of the locking connection provided between the preliminary sieve and the jet distributor in a detailed representation of FIG. 15, FIG. 18 a longitudinal cross-sectional view of the jet distributor embodied as a perforated plate and connected to a preliminary sieve of a jet regulator, otherwise not shown in greater detail, with locking cams being provided protruding upstream from the circular collar, which can be inserted into a receiving opening, for a detachable locking to the preliminary sieve, FIG. 19 a top view of the jet distributor of FIG. 18 of the upstream face, FIG. 20 a detailed longitudinal cross-sectional view of the locking connection shown in between the preliminary sieve and the jet distributor of FIGS. 18 and 19, FIG. 21 a view of a plumbing fixture comprising an upstream preliminary sieve, a downstream jet distributor, and a flow regulator arranged therebetween, with the preliminary sieve, comprising a transparent material and being insertable into a receiving opening at the jet distributor, being provided at its sieve circumference with several locking cams for a detachable interlocking with the jet distributor, FIG. 22 a top view of the preliminary sieve of FIG. 21 at its upstream face, and FIG. 23 a detailed longitudinal cross-sectional view of the locking connection, shown in between the preliminary sieve and the jet distributor of FIGS. 21 and 22.
Figure 2:
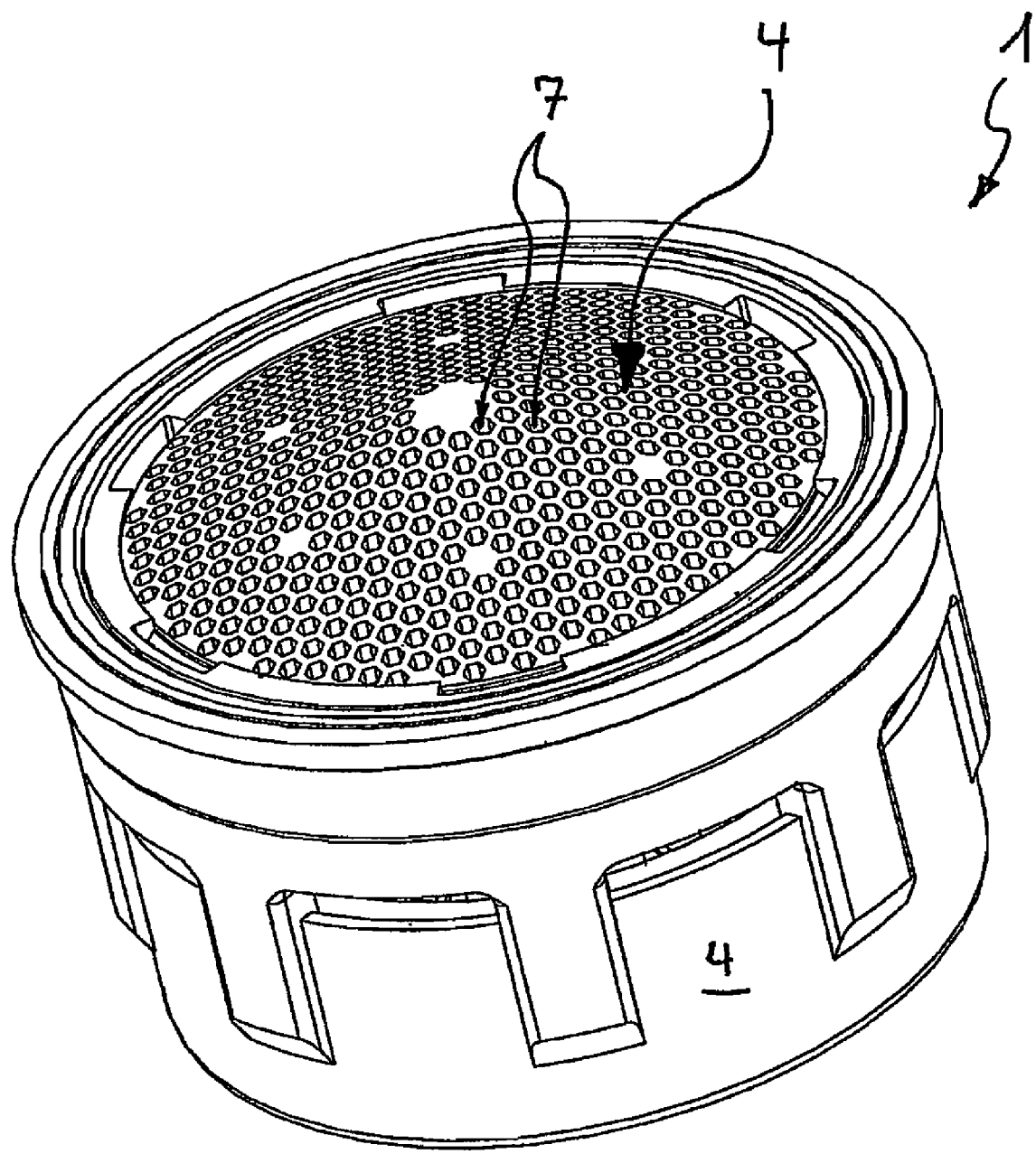
Figure 3:
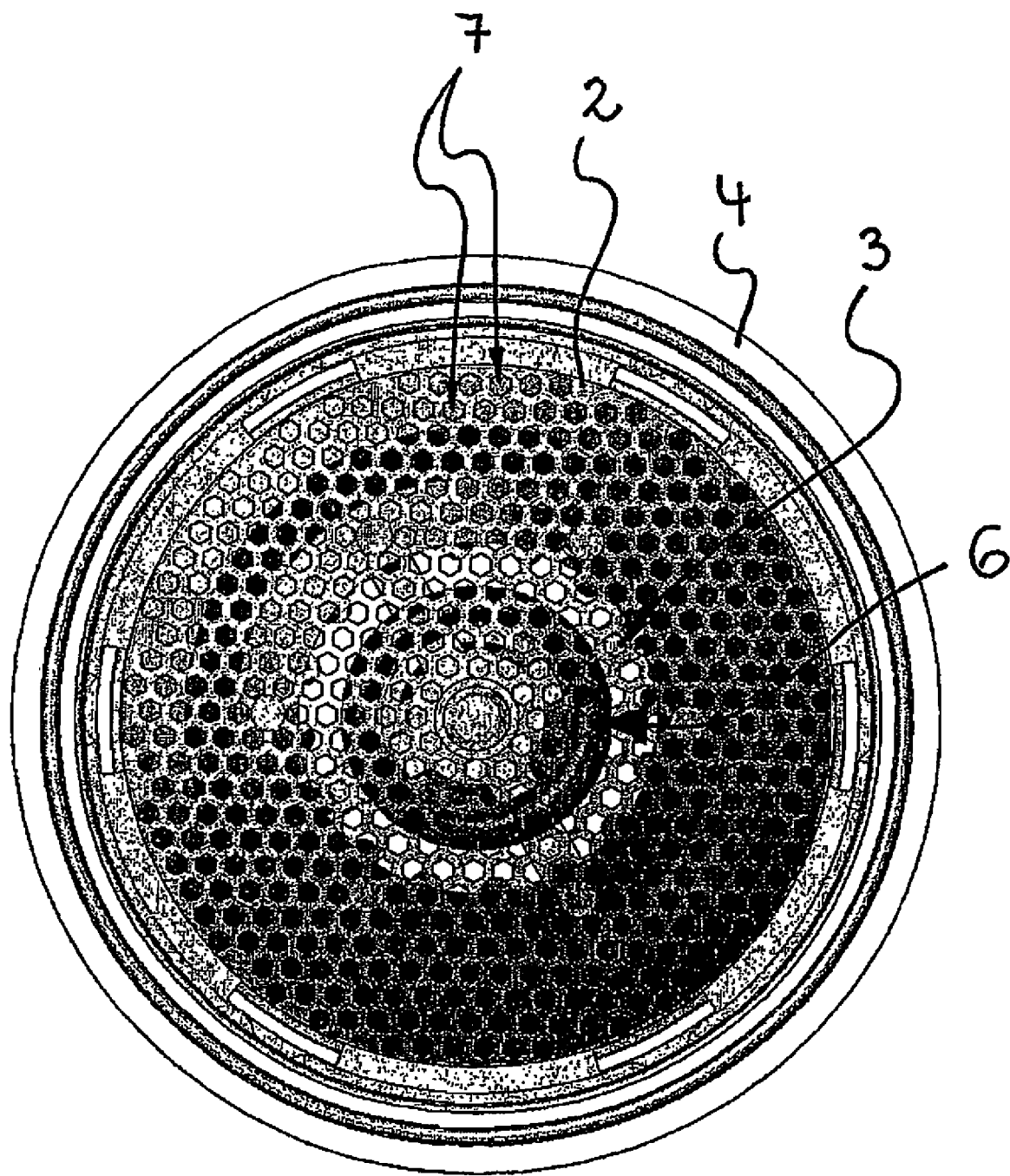

In FIGS. 1 through 3 a plumbing functional unit 1 is shown, which can be inserted into an outlet opening, not shown, which can be screwed to the water outlet of a plumbing fixture. The plumbing functional unit 1 is provided with an upstream filter or preliminary sieve 2, a downstream flow regulator 3, and a jet regulator 4 arranged downstream.

The jet regulator 4, located downstream in reference to the detachably connected components 2, 3, and 4 of the functional unit 1, is to form a homogenous aerated-soft water jet from the water flowing through it. Using the flow regulator 3 arranged between the jet regulator 4 and the filter sieve 2, the amount of water per unit time is adjusted to a predetermined maximum value. The filter sieve 2 has the purpose, among other things, to protect the downstream located inserted plumbing parts 3, 4 from any potentially entrained dirt particles, which otherwise could plug up the flow openings of these inserted parts 3, 4 and interfere with their function.

The filter sieve 2 is embodied as a one-piece injection molded plastic part and made from a transparent plastic material. Due to the fact that the filter sieve 2 is made from a transparent plastic material from the upstream side, it opens the view to the inserted plumbing parts 3 detachably connected to the filter sieve 2.

In FIG. 1 it is discernible that the flow regulator 3 has a control gap 5, with its flow cross-section being adjustable via an O-ring 6 made form an elastic material, which is deformable under the pressure of incoming water. Due to the fact that the O-ring 6 is movably mounted at the flow regulator 3, there is the risk that the O-ring can separate from the flow regulator 3 and can get lost.

The filter sieve 2 ensures the functionality of the flow regulator 3 in several ways; on the one hand, the filter sieve 2 filters out the dirt particles entrained in the water, which otherwise could interfere with the function of the inserted parts, on the other hand it allows a visual control of the filter sieve 2 arranged downstream and the inserted parts located therebehind. Using a mere visual control through the filter sieve 2, it is perhaps easily detectable that the flow regulator 3 connected thereto is missing the necessary O-ring 6. Furthermore the filter sieve 2 connected to the flow regulator 3 in a detachable manner protects the flow regulator 3 from subsequently losing its O-ring.

Thus, it is possible for the user to easily recognize even in a filter sieve 2 already inserted into a faucet outlet, through the transparency of the filter sieve 2, if any and perhaps which inserted parts 3, 4 follow downstream and to what extent these inserted parts 3, 4 are operational.

The transparency of the filter sieve 2 is even enhanced in that the sieve openings 7 are essentially arranged coaxially in reference to each other and approximately parallel to the longitudinal axis of the sieve. This also insures the clear view through the sieve openings 7. Furthermore, the filter sieve 2 is curved convexly or conically in the upstream direction, so that any potential dirt particles can only adhere at the circumferential rim of the filter sieve 2 and cannot cover the sieve area and thus cannot compromise the visual control through the sieve 2.

It is a particular advantage of such a transparent filter sieve that through the filter sieve 2 any potential color coding is also discernible through the flow regulator 3 located therebelow, which color coding for example allows a conclusion of the flow capacity of said regulator 3.

The filter sieve 2 is provided at its sieve opening area with sieve openings 7 having hexagonal or honey-comb shapes. By this embodiment of the sieve openings 7 of the filter sieve 2, the filter sieve 2 is not only characterized in a comparatively large flow area, rather the visual control through the filter sieve 2 is additionally promoted.

From FIG. 1 it is discernible that via a locking connection the filter sieve 2 is detachably connected to the flow regulator 3. For this purpose, the filter sieve 2 has a locking groove 17, which can be connected in a detachable manner to at least one locking cam 13 or a similar locking means of the jet regulator 4. This locking protrusion 13 is provided at the upstream face of the jet regulator 4. Due to the fact that the flow regulator 3 is inserted in an upstream cavity of the jet regulator 4 and mounted in a detachable manner, the filter sieve 2 also secures the flow regulator 3 it covers. For this purpose the filter sieve 2 interlocked with the jet regulator 4 in a detachable manner has a downstream located central bar 10, which holds the flow regulator 3 located in the jet regulator cavity between the jet regulator 4 and the filter sieve 2.

From FIGS. 4 through 6, a plumbing fixture 1' is shown in an area of a jet distributor 11 that is part of a jet regulator otherwise not shown in any detail. The jet distributor 11 embodied as a perforated plate and distributing the incoming water into numerous individual jets is provided with a receiving opening 12, into which an upstream preliminary sieve 2 can be inserted in a detachable manner. While the preliminary sieve 2 is embodied as a first component, the jet distributor 11 is here provided as a second component of the jet regulator assembled from additional parts.

The parts 2, 11 can be interlocked in a detachable manner via locking means. For this purpose several locking cams 13 are provided at the preliminary sieve 2, which are arranged distributed at even distances from each other over the flange-like exterior circumference of the preliminary sieve 2.

The preliminary sieve 2, which is to keep dirt particles entrained in the water away from the flow openings 14 of the jet distributor 11, is provided with a slot 15 or a similar cavity in the area of the locking cams 13, arranged at a distance a from the exterior circumference of said first component 11. The extension of each of these slots is longitudinally aligned in the circumferential direction. A wall section 16, carrying the locking elements 13 at the exterior circumference is limited by the exterior circumference of the first component 11 and the adjacent slot 15, said wall section can be flexed into the slot 15 or a similar cavity in a spring-elastic fashion. Due to the fact that this wall section 16 can be led in a spring-elastic fashion and can also be returned spring-elastically due to the elasticity, the interlocking of the components 2, 11 can be performed with a reduced insertion force with a relatively wide tolerance range of the snap-in connection.

The locking cams 13 provided at the preliminary sieve 2 can be locked in an encircling locking cam 17 at the receiving opening 12 defining the interior circumference of the jet distributor 11. It is also possible that at least a number of partial locking grooves is provided according to the number of locking cams 13, and that by these interlocking locking elements, the correctly positioned allocation of the first and the second components shall be ensured.

As discernible from the top view in FIG. 5, the locking cam 13 narrows such towards its free cam end so that the edges of the locking cams aligned in the circumferential direction form an incline. From FIG. 6 it is discernible that the contact surfaces gliding over each other during the locking and unlocking process on the one hand that the circumferential edges limiting the locking groove on the other side have corresponding locking and unlocking inclines, which on the one hand with little expense allow and facilitate the impression of the preliminary sieve into the respective cavity of the jet distributor and the interlocking of these components, and if necessary also the unlocking and detaching of these components on the other hand. When the correctly positioned allocation of the components 2, 11 shall be ensured by the locking elements 13, 17 it is beneficial when the number of locking grooves and locking cams is equivalent and/or when the number of locking grooves is a multiple of the number of locking cams and when the locking cams and the locking grooves are essentially formed complementary.

From the longitudinal cross-sections in FIGS. 4 and 6, it is discernible that the locking cams 13 provided on the preliminary sieve 2 are arranged in one cross-sectional plane. These locking cams 13 arranged in one cross-sectional plane can snap-in with little expense in the cross-sectional plane of the locking cam 17 encircling the jet distributor 11.

In order to allow the locking elements 13, 17 to be easily and with little expense interlocked and unlocked from each other even in case of a comparatively thick-walled and bend-proof embodiment of the component 13, 17, the distance a of the slot 15 or a similar cavity from the exterior circumference of the first component 2 and thus the thickness of the wall section 16 to be aligned is selected depending on the desired spring elasticity of said wall section 16.

For reasons of comparison, the combination of a jet distributor 11' and a preliminary sieve 2' embodied according to prior art is shown in FIGS. 7 and 9. As discernible from the longitudinal cross-section in FIG. 7, the preliminary sieve 2' is provided with an locking cam 13" encircling at its exterior circumference, which engages also encircling the locking cam 17" at the jet distributor 11'. Due to the fact that these locking elements 13", 17" have to be relatively bend-proof in prior art according to FIGS. 7 through 9, the components 2', 11' have to be produced with a high level of precision and great expenses and have to be interlocked with a high impression force.

In contrast thereto in a component according to FIGS. 4 through 6, a reduced insertion force is sufficient for interlocking the components 2, 11. Here, the components 2, 11 can be produced with a relatively large range of tolerance of the interlocking connection. In spite of the fact that the first component 2 is intentionally deformed in the area of its interlocking means 13 for the purpose of interlocking the overall contour of the first component 2 remains the same in reference to the component 2' of prior art. Due to the fact that in the functional unit 1' according to the invention all components 2, 11 can also be connected to each other securely and firmly with little impression force, a rapid and dynamic assembly is facilitated during the production and the assembly of the fixture 1 shown in FIGS. 4 through 6.

In FIGS. 10 through 14, the jet distributor 11 embodied as a perforated plate, and the preliminary sieve 2 of a jet regulator are shown comparable to FIGS. 4 through 6. In the jet regulator shown in FIGS. 10 through 14, the jet distributor 11 is however provided with a number of locking cams 13 at the interior circumferential edge limiting the receiving opening 12, which cooperate with the locking flange-like encircling protrusion 17' at the preliminary sieve 2 acting as the locking counterpart.

The locking cams 13 provided at the interior side at the jet distributor 11 can each be flexed into a slot 15 or a similar cavity in a spring-elastic fashion. These cavities 15 are provided at the interior circumferential rim of the jet distributor 11 defining the receiving opening 12 that accepts the preliminary sieve 2 in the area of the locking cams 13.

From FIG. 12 it is discernible that the locking cams 13 are arranged evenly distributed over the interior circumference of the jet distributor 11. FIG. 13 illustrates that the distance a of the slot 15 or a similar cavity of the interior circumference of the jet distributor 11 can be selected depending on the desired spring elasticity of the wall section 16 that can be deflected therein.

From a comparison of FIGS. 11 and 14 it is discernible that the preliminary sieve 2 is embodied flange-like at its exterior circumference in the area of the encircling locking counterpart 17' cooperating with the locking cams 13.

In FIG. 14 it is discernible that the face edges of the locking cams 13 facing each other, on the one hand, and the locking counterparts 17' provided at the preliminary sieve 2, on the other hand, are embodied with sharp edges. Due to this sharp-edged embodiment, the preliminary sieve 2 can be connected to the respective jet distributor 11 in an almost undetachable manner. It is also possible, though, to provide complementarily formed sliding inclines at face edges of the locking cams on the one hand and the locking counterpart 17' on the other hand, facing each other, which, if necessary, also allow a locking and unlocking of these components 2, 11.

In order to allow a spring-elastic locking of the locking cam 13 or a similar locking means, the respective cavities 15 can be segmented and limited to the area of the locking cams 13 or similar locking means. However, it is also possible to embody the cavity 15 for aligning the locking cams 13 encircling beyond the area of the locking cams 13.

When the two components 2, 11 shall be connected to each other in an undetachable manner it can be beneficial for the flange-like locking counterpart 17' at the preliminary sieve to be embodied with sharp edges in the respective circumferential segments and in other circumferential segments in a rounded fashion or faceted in order to reduce the production expense and to allow a respective injection-molded part to be easily removed from a comparatively simple injection mold.

In FIGS. 15 through 17, a plumbing part 1' is shown in the area of a jet distributor 11 allocated to a jet regulator, otherwise not shown in greater detail. The jet distributor 11 embodied as a perforated plate and distributing the incoming water into numerous individual jets is provided with an axially protruding circular collar 30 at its upstream face, which carries a locking groove 17 at the exterior circumference and can be inserted into a receiving opening 12 of the preliminary sieve 2. As discernible from the bottom view to the downstream face of the preliminary sieve 2 shown in FIG. 16, the preliminary sieve 2 has several locking cams 13 at its interior circumference defining the receiving opening 12 arranged distributed at even distances over the circumference of the sieve.

While the preliminary sieve 2 forms a first component, the jet distributor 11 is here provided as a second component of the jet regulator assembled from additional parts. The components 2, 11 can be detachably locked via locking means. The preliminary sieve 2, which shall keep dirt particles entrained in the water from the flow openings 14 of the jet distributor 11, not located in the cross-sectional plane here and thus only indicated, has a slot 15 or a similar cavity in the area of each locking cam 13, which is arranged at a distance a from the interior circumference of this first component 11. Each of these slots 15 is provided with a longitudinal extension aligned in the circumferential direction.

Between the interior circumference of the first component 2 and each adjacent slot 15, a wall section 16 is defined carrying the locking elements 13 at the interior circumference, which can be led into the slot 15 or a similar cavity in a spring-elastic manner. Due to the fact that this wall section 16 can be led inward in a spring-elastic fashion and based on the spring elasticity can also be pushed outward in a locking position by spring-force, a relatively wide tolerance range of the snap-in connection is possible for locking the component 2, 11 with a reduced insertion force. As discernible from the detail of the longitudinal cross-section in FIG. 17, the locking cams 13 provided at the preliminary sieve 2 can be interlocked in an encircling locking groove 17 at the circular collar 30 of the jet distributor 11. It is also possible that at least a number of partial locking elements according to the number of locking cams 13 is provided and that by these interlocking locking elements, the correctly positioned allocation of the first and the second component 2, 11 shall be ensured.

However, the fixture 1' in FIGS. 18 through 20 has a number of locking cams 13 protruding radially towards the outside circular collar 30 of the jet distributor 11 that can be inserted into the receiving opening 12 of the preliminary sieve 2, which can interlock into a locking groove 17 at the interior circumference of the preliminary sieve 2 defining the accommodating opening 12. In the area of the locking cam 13, a slot 15 or a similar cavity is each provided, which is arranged at a distance a from the exterior circumference of the partial area of the jet distributor 11 embodied as a circular collar. Each of these slots 15 has a longitudinal extension aligned in the circumferential direction. A wall section 16 carrying the locking elements 13 at the exterior circumference is limited between the interior circumference of the jet distributor 11 and the adjacent slots 15, said wall section can be flexed into the slot 15 or a similar cavity in a spring-elastic manner.

From a comparison of FIGS. 15 through 17 and/or 18 through 20, on the one hand, and the FIGS. 4 through 6 and/or 7 through 9, on the other hand, it is discernible that the preliminary sieve 2 cannot only be mounted in a receiving opening 12 at the jet distributor 11, but rather the jet distributor 11 can also be mounted in the receiving opening 12 of the preliminary sieve 2.

In FIGS. 21 through 23, a plumbing fixture 1' is shown, which can be inserted into an outlet mouthpiece not shown in greater detail, which can be screwed to the water outlet of a faucet. The plumbing fixture 1' has an upstream preliminary sieve 2, with a flow regulator 3 and a jet regulator following downstream, of which jet regulator here only the jet distributor 11 is shown, though.

From the components 2, 3 and 11, which can be connected to each other in a detachable manner, the downstream jet regulator serves to form a homogenous, aerated-soft water jet from the water flowing through it. Using the flow regulator 3 arranged between the jet distributor 11 and the preliminary sieve 2, the water flow per unit time is adjusted to a predetermined maximum value. The preliminary sieve 2 has the purpose, among other things, to protect the inserted plumbing components 3, 11 positioned downstream from any dirt particles potentially entrained in the water, which otherwise could plug the flow openings of these inserted parts 3, 11 and compromise their function.

The preliminary sieve 2 is embodied as a one-piece injection-molded plastic part and made from a transparent plastic material. Due to the fact that the preliminary or filter sieve 2 is made form a transparent plastic material it opens the view to the upstream side of the inserted part 3 connected in a detachable manner to the preliminary sieve 2. In FIG. 21, it is discernible that the flow regulator 3 has a control gap 5, with its flow area being adjustable by an O-ring 6 made from an elastic material deformable under the pressure of the incoming water. Due to the fact that the O-ring 6 is mounted movably at the flow regulator 3, there is the risk that the O-ring 6 separates from the flow regulator 3 and can become lost. The preliminary sieve 2 comprising a transparent material ensures the functionality of the flow regulator 3 in several ways; the preliminary sieve 2 filters out, on the one hand, the dirt particles entrained in the water, which otherwise could interfere with the function of the inserted parts 3, 11, on the other hand it allows a visual control of the parts located downstream in reference to the filter or preliminary sieve 2 and the inserted parts therebehind. When looking from the top through the preliminary sieve 2 comprising a transparent material it is discernible if the plumbing fixture 1 in FIG. 21 is even provided with a flow regulator 3. When this flow regulator 3 is additionally color-coded, the hydraulic flow capacity of the flow regulator 3 arranged between the preliminary sieve 2 and the jet distributor 11 is easily visible through the preliminary sieve 2. Using a simple visual control through the preliminary sieve 2 it is also easily discernible, if necessary, if the flow regulator 3 has the necessary O-ring 6. Due to the fact that the flow regulator 3 is clamped between the preliminary sieve 2, on the one hand, and the jet distributor 11 interlocked with the preliminary sieve 2, on the other hand, the preliminary sieve 2 also protects the flow regulator 3 from a subsequent loss of its O-ring 6.

From FIG. 21 it is discernible that the flow regulator 3 rests on the upstream face of the jet distributor 11 and the transparent preliminary sieve 2 is supported on the flow regulator 3 via the central support bar 31. In case of a contaminated sieve surface of the preliminary sieve 2 the stress acting from the top upon the preliminary sieve 2 is very great. In order to prevent the preliminary sieve 2, which is made from a transparent material and perhaps has a reduced inert stiffness, from collapsing under such load, the preliminary sieve 2 is supported via its central support bar 31 and/or via additional supports 32 distributed at the circumference of the sieve on the regulator housing of the flow regulator 3. In FIG. 21, it is discernible that between the preliminary sieve 2 and the flow regulator 3, in an unstressed operational state, initially an air gap remains, in particular in the area above the supports 32 arranged distributed over the circumference of the sieve. Only when the preliminary sieve 2 begins to distinctly deform under the load of the incoming water the supports 32 can rest on the flow regulator 3 and protect the preliminary sieve 2 from any excessive deformation.

The invention claimed is:

1. A plumbing fixture (1') which can be inserted into a plumbing outlet, comprising a first component (2, 11) which can be inserted into a receiving opening (12) of a second component (11, 2), the first and second components (2, 11)

are connected to each other via a plurality of locking parts (13) and at least one counter-locking part (17, 17'), with one of the components having the plurality of locking parts (13) and the other of the components having the at least one counter-locking part (17, 17') serving as a counter-part to said locking part, one of the components (2, 11) carries said plurality of locking parts at an exterior or interior perimeter of a wall section (16) and in an area of the locking part it is provided with a recess defined in said one of the components that is located at a distance (a) from the exterior or interior perimeter of the wall section of said one of the components, and the wall section of the component carrying the plurality of locking parts at the exterior or interior perimeter can be inserted in a spring-elastic fashion into the at least one counter-locking part via a resilient deflection of the wall section into the recess.

2. A fixture according to claim 1, wherein the plurality of locking parts and at least one counter-locking part comprise a locking groove or locking cam.

3. A fixture according to claim 1, wherein the recess comprises a slit.

4. A fixture according to claim 1, wherein the plurality of locking parts (13) are provided, arranged distributed over at least one of the interior or exterior perimeter of said one of the components (2, 11), and a corresponding number of separate ones of the recesses are defined in said one of the components in the areas of the respective locking parts at the distance (a) from the interior or exterior perimeter.

5. A fixture according to claim 1, wherein the plurality of locking parts and at least one counter-locking part (13, 17, 17') ensure a correctly positioned allocation of the first and the second components (2, 11).

6. A fixture according to claim 2, wherein at least a plurality of the locking grooves are provided equivalent to a number of the locking cams.

7. A fixture according to claim 6, wherein the locking cams and the locking grooves are generally embodied in a complementary fashion.

8. A fixture according to claim 1, wherein the plurality of locking parts and at least one counter-locking part (13, 17, 17') provided on the first and the second component (2, 11) each are arranged in a cross-sectional plane.

9. A fixture according to claim 1, wherein the recess comprises a slot or a similar cavity and the distance (a) of the slot (15) or similar cavity from the exterior or interior periphery of the respective component (2, 11) is selected depending on a desired spring elasticity of the wall section (16) that can be flexed into it.

10. A fixture according to claim 1, wherein one of the components (2, 11) is provided with a flange-like exterior or interior circumference in an area of at least one of the locking parts.

11. A fixture according to claim 1, wherein the plurality of locking parts comprises locking cams (13) provided on the first component (2, 11), which cooperate with the at least one counter-locking part that comprises at least one locking groove or a counter-locking part (17, 17') on the second component (11, 2).

12. A fixture according to claim 1, wherein the plurality of locking parts comprises locking cams (13) provided on the second component (11, 2) which cooperate with at least one locking groove or counter-locking part (17, 17') on the first component (2, 11).

13. A fixture according to claim 1, wherein the first component (2) is embodied as a preliminary or filter sieve (2) and the second component (11) comprises at least one of a jet regulator, flow regulator, or a backflow preventer.

14. A plumbing fixture (1') which can be inserted into a plumbing outlet, comprising a first component (2, 11) which can be inserted into a receiving opening (12) of a second component (11, 2), the first and second components (2, 11) are connected to each other via at least one locking part (13) and counter-locking part (17, 17'), with one of the components having the at least one locking part (13) and the other of the components having the counter-locking part (17, 17') serving as a counter-part to said locking part, one of the components (2, 11) carries said at least one locking part at an exterior or interior perimeter of a wall section (16) and in an area of the locking part it is provided with a recess defined in said one of the components that is located at a distance (a) from the exterior or interior perimeter of the wall section of said one of the components, and the wall section of the component carrying the at least one locking part at the exterior or interior perimeter can be inserted in a spring-elastic fashion into the at least one counter-locking part via a resilient deflection of the wall section into the recess, further comprising a filter sieve (2) for water outlet faucets and having a number of flow or sieve openings (7) the filter sieve (2) is made from a transparent or semitransparent material.

15. A fixture according to claim 14, wherein the filter sieve (2) is an injection molded part and/or made from plastic.

16. A fixture according to claim 14, wherein the filter sieve (2) is detachably connected to at least one inserted downstream plumbing part (3, 4, 11).

17. A fixture according to claim 14, wherein the filter sieve (2) opens or keeps open a view to an upstream side of the filter sieve (2) allocated to the at least one inserted plumbing part (3, 4).

18. A fixture according to claim 14, wherein the filter sieve (2) is allocated to a downstream flow regulator (3) and/or a flow limiter.

19. A fixture according to claim 14, wherein the filter sieve (2) is allocated to a flow regulator (3), the filter sieve (2) being arranged upstream thereof and downstream thereof is a jet regulator (4).

20. A fixture according to claim 18, wherein the flow regulator (3) has a control gap (5), with a flow area being adjustable via an O-ring (6) that can be deformed under the pressure of incoming water and is made from an elastic material, and the O-ring (6) is visible through the filter sieve (2) allocated to the flow regulator (3).

21. A fixture according to claim 14, wherein the filter sieve (2) is curved convexly or conically in an upstream direction.

22. A fixture according to claim 14, wherein sieve openings (7) of the filter sieve (2) are arranged approximately coaxially in reference to each other and parallel to a longitudinal axis of the sieve.

* * * * *